United States Patent [19]

Corbeil et al.

[11] Patent Number: 5,389,987
[45] Date of Patent: Feb. 14, 1995

[54] MOTION TRANSLATION DEVICE FOR POSITIONING CAMERAS AND OTHER AIMED INSTRUMENTS

[76] Inventors: Gilles D. G. Corbeil, 53b Glen Manor Drive, Toronto, Ontario, Canada, M4E 2X5; Gerd E. Kurz, 1211 Fawndale Road, Pickering, Ontario, Canada, L1V 4M4

[21] Appl. No.: 99,798

[22] Filed: Jul. 30, 1993

[51] Int. Cl.$^6$ ............................................. G03B 29/00
[52] U.S. Cl. ........................................ 354/82; 224/908; 352/243
[58] Field of Search ................ 354/82, 81, 293; 352/243; 224/908

[56] References Cited

U.S. PATENT DOCUMENTS

| | | | |
|---|---|---|---|
| 1,698,063 | 1/1929 | Ohlau | 354/293 |
| 2,638,041 | 5/1953 | Horydczak | 354/293 |
| 2,753,778 | 7/1956 | Tolcher . | |
| 2,771,014 | 11/1956 | Tolcher | 224/908 |
| 2,961,937 | 11/1960 | Karpf . | |
| 3,984,855 | 10/1976 | Baczynsky . | |
| 4,187,021 | 2/1980 | Balser | 354/293 |
| 4,198,150 | 4/1980 | Sloop . | |
| 4,272,177 | 6/1981 | Ottenheimer | 354/293 |
| 5,098,182 | 3/1992 | Brown | 352/243 |

*Primary Examiner*—Monroe H. Hayes
*Attorney, Agent, or Firm*—Bereskin & Parr

[57] ABSTRACT

A device for translating motion of an operator's wrist and arms into controlled movement of a motion picture camera or other instrument comprises a mounting plate, a pair of spaced outer yokes coupled thereto, a pivotal inner member pivotally mounted within each of the outer yokes at opposed pivot points defining a pivot axis, and a pair of hand grips rigidly mounted within the inner members at a selected angle to the pivot axis. The outer yokes are preferably open rings having a pair of free-ends, and the inner yokes are preferably closed rings.

20 Claims, 4 Drawing Sheets

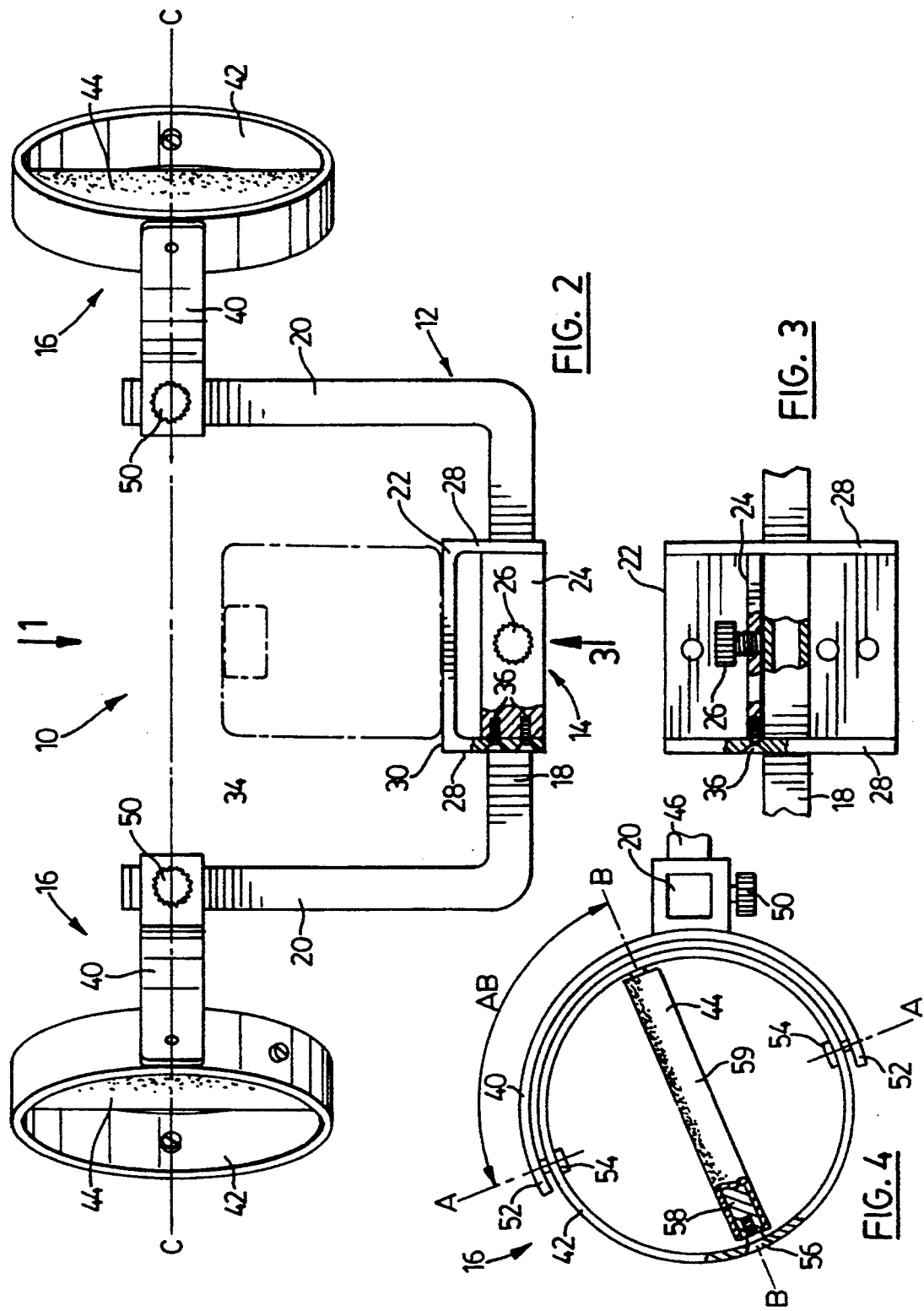

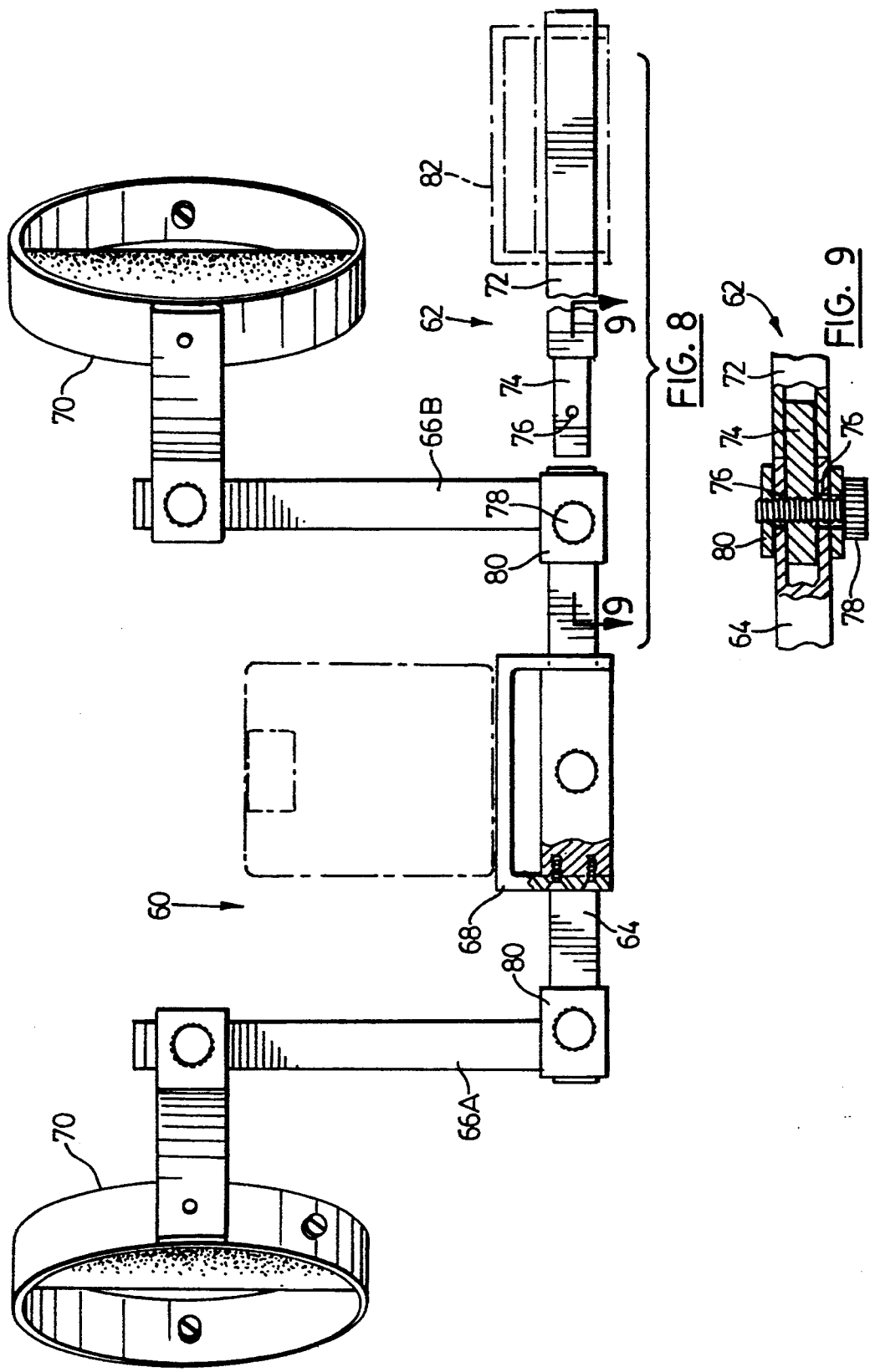

MOTION TRANSLATION DEVICE FOR POSITIONING CAMERAS AND OTHER AIMED INSTRUMENTS

BACKGROUND OF THE INVENTION

Over the years, motion picture cameras such as video and movie cameras have become smaller and lighter, enabling users to move and position such cameras in more imaginative ways. For example, video and movie film camera operators have been able to film subjects while following them on foot or in moving vehicles. However, moving a hand-held video or movie camera during operation tends to impart a certain amount of unwanted vibration or other unsteady movement to the camera, which is of course recorded on the film or videotape. In order to address this problem, various types of camera holding and steadying devices, such as hand grips and shoulder mounts, have been developed, but these devices have their drawbacks. The Steadicam TM system, utilizing an exoskeletal vest and a dampening arm connected thereto, greatly improves camera mobility, in that it allows an operator to tilt, pan and crane a camera in a relatively steady fashion, while being moved about by the operator during operation. However, the Steadicam system is very complex and costly, and the Steadicam operator's mobility remains somewhat limited.

There is accordingly a continuing need for a low-cost device for positioning hand-held motion picture cameras, such as video cameras and moving film cameras, in a steady fashion, as the camera is operated, particularly when the operator moves about.

SUMMARY OF THE INVENTION

The subject invention is a device for translating movement of an operator's wrist and arms into controlled movement of a motion picture camera or other continuously aimed instrument. The device comprises instrument holding means for holding the instrument, a pair of outer yokes coupled to the holding means, a pivotal inner member pivotally mounted within each of the outer yokes at opposed pivot points defining a pivot axis, and a pair of hand grips rigidly mounted within the inner member at a predetermined angle to the pivot axis.

The outer yokes are preferably open, semi-circular rings having a pair of free ends. The inner members are preferably closed rings. Together, each inner closed ring mounted within an open outer half ring forms a gimbal-type pivotal mount. The hand grip is preferably mounted diametrically across the inner ring at an angle to the pivot axis.

The holding means preferably comprises a central platform which is slidably received on a cross-bar member, and a pair of uprights which extend upwardly from the ends of the cross-bar member. The open half rings are preferably rigidly secured to a sleeve which is slidably received on the uprights. The gimbal-type mount assemblies are preferably mounted near the top of the uprights above the centre of gravity of the camera secured to the central platform. Each gimbal-type mount is preferably mounted at the same height above the camera platform, so as to define a torque axis spaced above the camera's center of gravity.

In an alternative embodiment, the holding means comprises both a central platform situated between the hand grip assemblies, and a side platform removably mounted on an outrigger or side extension extending to one side of one of the hand grip assemblies.

BRIEF DESCRIPTION OF THE DRAWINGS

The invention will now be described, with reference to the following drawings, in which:

FIG. 2 is an elevational view of the subject camera positioning device;

FIG. 3 is a detailed bottom plan view of a central portion of the camera positioning device;

FIG. 4 is a top plan view of one of the gimbal-type mounts of the subject invention, with the inner ring shown in the same plane as the outer half ring;

FIG. 8 is an elevational view of an alternative embodiment of the subject camera positioning device; and FIG. 9 is a sectional view taken along line 9—9 of FIG. 8.

DETAILED DESCRIPTION OF THE PREFERRED EMBODIMENTS

Figure 1:
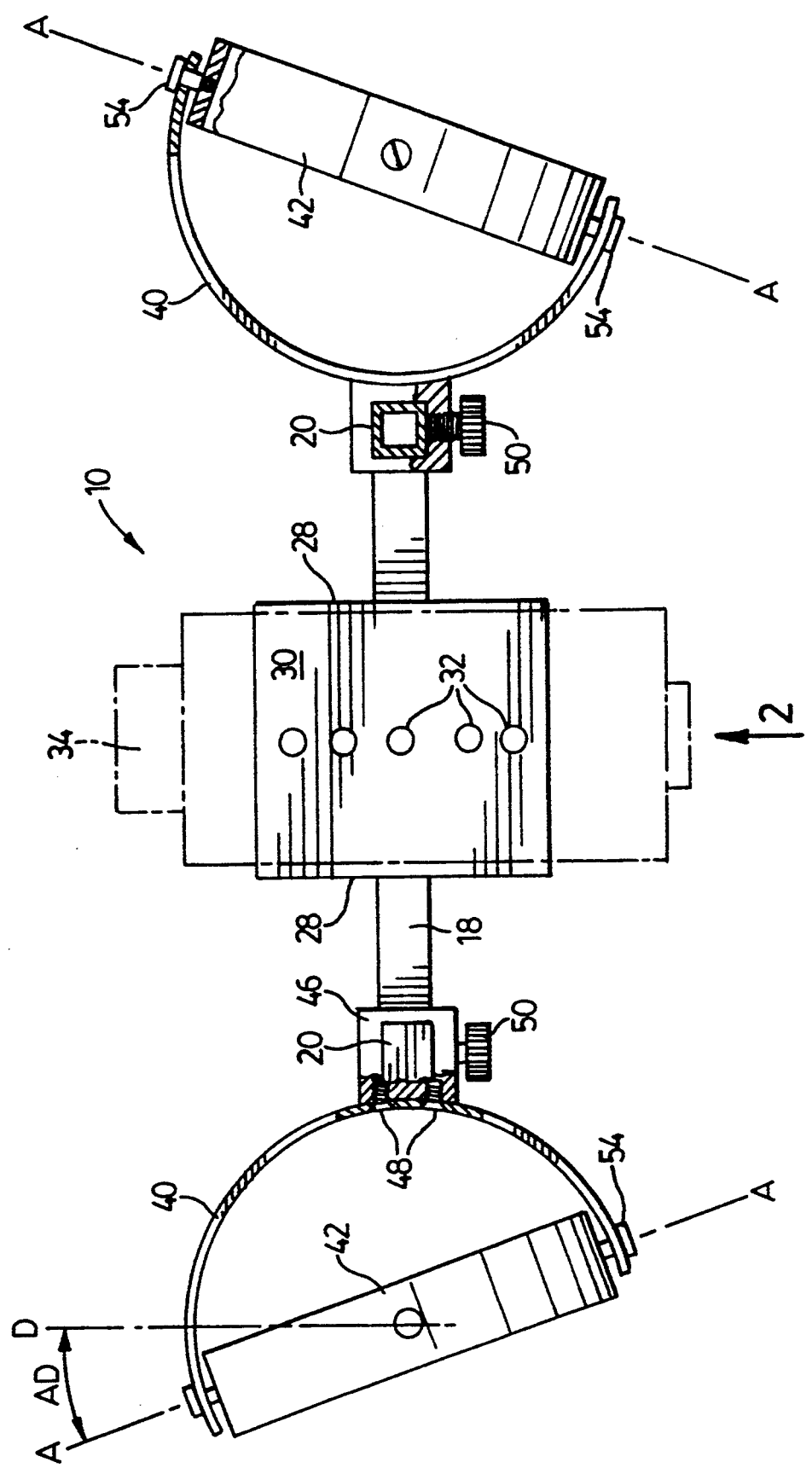
FIG. 1 is a top plan view of a preferred embodiment of a camera positioning device made in accordance with the subject invention.

FIGS. 1 and 2 illustrate a motion translation device made in accordance with the subject invention, which is adapted to translate the movement an operator's wrists and arms into controlled positioning of the camera. Positioning device shown generally as 10 comprises a U-shaped cradle bar 12, camera holding means 14, and a pair of pivotal hand grip assemblies 16. Cradle bar 12 comprises a cross-piece section 18 and a pair of spaced upright sections 20 extending upwardly from the ends of cross-piece section 18. Camera holding means 14 comprises mounting plate 22 slidably mounted on cross-piece section 18, pressure plate 24, and locking bolt 26. Mounting plate 22 is preferably an aluminium extrusion in the shape of an inverted U, having plate sides 28 and flat plate top 30 having apertures 32 therein for detachably securing camera 34 (shown in ghost lines) thereto.

As shown in FIG. 2 and FIG. 3, pressure plate 24 extends between the inside surfaces of plate sides 28 and is attached thereto by fasteners 36. Locking bolt 26 when tightened applies pressure to cross-piece section 18, thereby immobilizing mounting plate 22 in a selected position between uprights 20.

As best shown in FIG. 4, each of pivotal hand grip assemblies 16 comprises an outer yoke or collar 40, a pivotal inner ring member 42, and hand grip 44. Outer yoke 40 is rigidly mounted to sleeves 46 by fasteners 48 (shown in FIG. 1). Sleeves 46 are short pieces of square tubing sized to be slidably received on upright sections 20, having an aperture for receiving a locking screw 50. When tightened, locking screw 50 bears against the side of upright section 20, and releasably secures sleeve 46 thereto at a selected height. When mounted to upright sections 20, yokes 40 extend outwardly therefrom at a 90° angle thereto. Yoke 40 as shown is a semi-circular open ring having free ends 52. Yoke 40 is preferably rigidly secured in an offset or off centre fashion to sleeves 46.

Pivotal inner ring member 42 has a diameter slightly less than that of yoke 40, and is pivotally secured to the free ends 52 of yoke 40 by lugs 54, so as to pivot freely about pivot axis A—A. Pivot axis A—A is preferably offset by an angle AD of about 20°–30° to the camera lens axis, as shown in FIG. 1. Hand grip 44 extends diametrically across inner ring member 42 at a grip angle AB to pivot axis A—A, as shown in FIG. 4, and is fastened to the inside surface of inner ring members 42 by fasteners 56. Grip angle AB is preferably 90° or less. Hand grip 44 as shown is a cylindrical piece of aluminum stock 58 covered by foam gripping pad 59.

As shown, hand grip assemblies 16 comprise a hand grip 44 pivotally mounted to cradle bar 12 by means of a modified gimbal mount, comprising a half-ring outer yoke 40 and an inner closed ring 42. Hand grip assemblies 16 are preferably mounted above the center of gravity of camera 34 when mounted on mounting plate 22, for stability. Outer yokes 40 of hand grip assemblies 16 are preferably secured to upright sections 20 so as to lie in the same plane, and define a torque axis C—C a suitable distance above the center of gravity of camera 34, as shown in FIG. 2.

Figure 5:
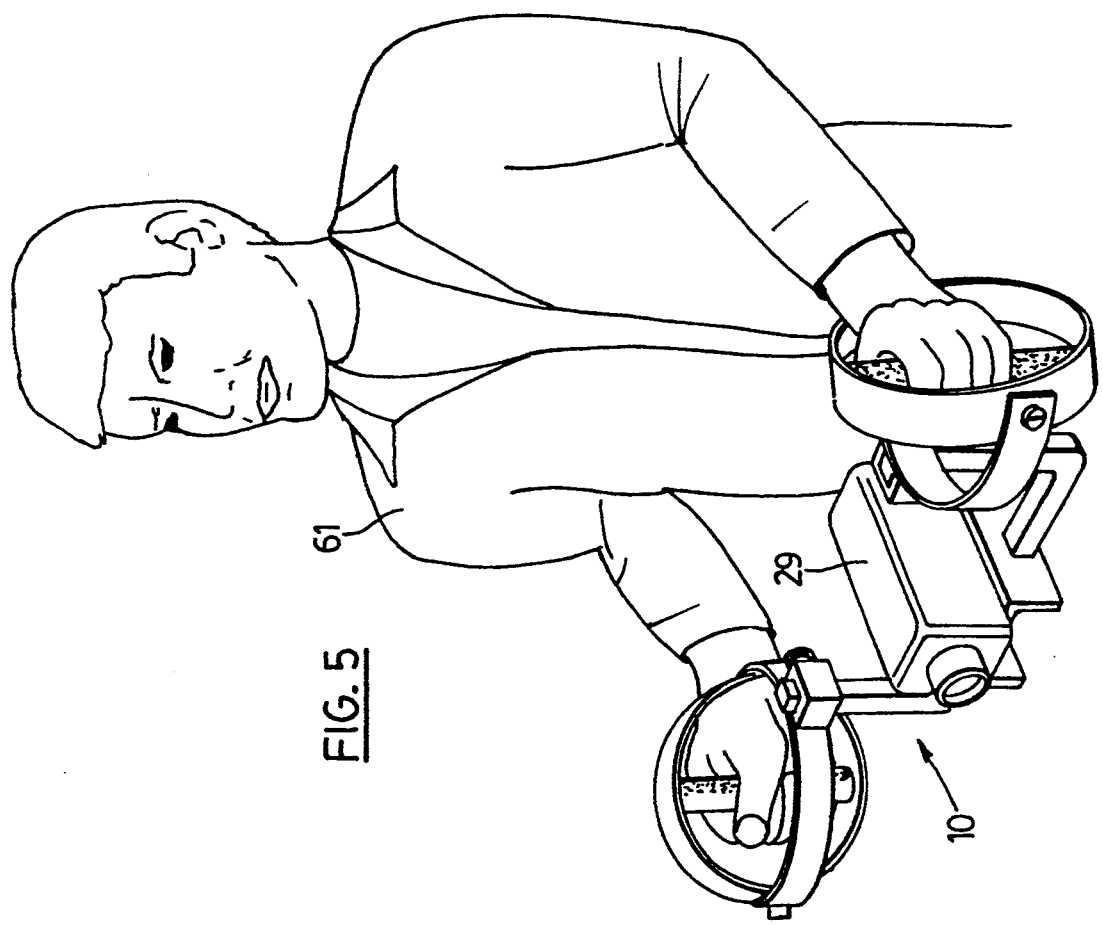
FIG. 5 is a perspective view of the subject camera positioning device being held by a camera operator.

Referring now to FIG. 5, the subject camera positioning device 10 is shown carrying video camera 34 and being held in an operating position by camera operator 61. Positioning device 10 allows the operator 61 to translate various wrist and arm movements into controlled movement of the camera.

To facilitate tilting of camera 34, pivot axis A—A is preferably offset as shown, by mounting yoke 40 in an off-center fashion as discussed above. Radial (up and down) rotation of the operator's wrists imparts a torque to the manipulating device about torque axis C—C and causes camera 34 to rotate about torque axis C—C.

The subject positioning device facilitates panning (side-to-side motion in the same plane) movement of the camera in that the pivotal hand grips enable the operator to rotate or otherwise move his wrists slightly while panning, thus relieving stress, without affecting the steadiness of the camera during the pan.

Figure 7:
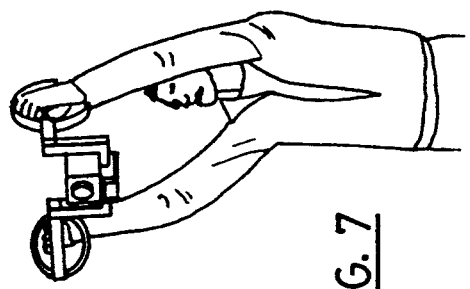
FIGS. 6 and 7 illustrate how the subject positioning device can facilitate the craning of a camera.
Figure 6:
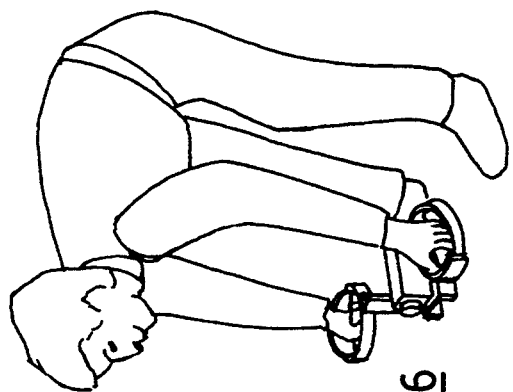

Referring now to FIGS. 6 and 7, positioning device 10 also facilitates craning action of the camera (up-and-down movement). When the camera is held in a low position as shown in FIG. 6, the operator receives feedback from the bottom heavy state of the camera to enable him to achieve the best "at rest" position for the camera. The camera can then be craned upwards to a position above the operator's head by appropriate rotation of the wrists and movement of the operator's arms while keeping the camera steady. Conventional viewing assist means, such as a wireless video-assist, comprising a T.V. transmitter and a monitor mounted outside the camera's field of view, may be utilized to enable the operator to view what is being photographed by the camera as the camera is being tilted, panned and craned.

The subject motion translation device is accordingly a hand-held, light weight, low cost device which facilitates the positioning of a camera or other continuously aimed instrument during operation, in a controlled and steady fashion, by translating wrist and arm movement into controlled movement of the instrument. The subject device produce a greater amplitude of movement than any other known device, while at the same time giving feedback to the operator to enable him to steady the instrument.

Referring now to FIGS. 8 and 9, illustrated therein is an alternative embodiment of the subject camera positioning device, shown generally as 60, having a detachable outrigger shown generally as 62. Alternative positioning device 60 comprises a cross-piece 64 having mounted thereto two uprights 66A, 66B, a central camera holding plate 68, and a pair of hand grip assemblies 70 similar to assemblies 16 of the preferred embodiment 10. Outrigger 62 comprises square tubular body 72 having coupling bar 74 extending laterally outwardly from one end thereof. Outrigger 62 is coupled to cross-piece 64 by sliding bar 74 into the end thereof and threading bolt 78 in sleeve 80 through aperture 76 in bar 74.

Outrigger 62 includes an outrigger holding plate shown in dotted lines 82 similar to mounting plate 68 slidably received on outrigger body 72. This alternative embodiment 60 enables a camera to be placed either on central holding plate 68 or outrigger plate 82, and has a number of applications. For example, outrigger 62 would enable an operator sitting in a moving vehicle to film action shots outside the vehicle by placing outrigger 62 outside the vehicle's window. As shown, outrigger 62 extends to the right of the user in operating position, but it could be removed from the end of cross-piece 64 near right upright 66B and placed in the end of cross-piece 64 near left upright 66A so that outrigger 62 extends laterally to the left of the user.

It should be understood that while the subject positioning device is illustrated and described with reference to its use as a camera positioning device, it could be used to facilitate the steady movement of other continuously aimed instruments, such as fire hoses.

Further, while the subject outer yoke and inner members as shown are circular rings, they could be square or rectangular.

It should therefore be understood that various changes can be made to the various embodiments of the invention disclosed and illustrated herein, without departing from the subject invention, the scope of which is defined in the appended claims.

We claim:

1. A device for translating motion of an operator's wrist and arms into controlled movement of a motion picture camera or other aimed instrument, comprising:
   (a) instrument holding means for holding the instrument;
   (b) a pair of spaced outer yokes coupled to the holding means;
   (c) a pivotal inner member pivotally mounted within each of the outer yoke at opposed pivot points defining a pivot axis; and
   (d) a pair of hand grips rigidly mounted within the inner members at a selected angle to the pivot axis.

2. The device defined in claim 1, wherein the outer yokes are open rings having a pair of free ends.

3. The device defined in claim 2, wherein the open yoke rings are semi-circular.

4. The device defined in claim 2, wherein the inner members are closed inner rings.

5. The device as defined in claim 4, wherein the hand grips are mounted diametrically across the inner rings at a grip angle to the pivot axis.

6. The device as defined in claim 5, wherein the grip angle is about 90°.

7. The device defined in claim 2, wherein the open rings are mounted to the holding means in an offset fashion, such that the pivot axis is placed at an angle to the axis of the aimed instrument.

8. The device as defined in claim 7, wherein the pivot axis angle is in the range of 20°–30°.

9. The device as defined in claim 1, wherein the instrument holding means comprises a mounting plate and support means coupled thereto for supporting the mounting plate.

10. The device as defined in claim 9, wherein the support means comprises a cross-piece member for slidably receiving the mounting plate.

11. The device as defined in claim 10, wherein the support means comprises a pair of uprights coupled to the end of the cross-piece member and extending upwardly therefrom.

12. The device as defined in claim 11, wherein outer yokes are slidably coupled to the uprights.

13. The device as defined in claim 12, wherein height of uprights are selected to enable the outer yokes to be positioned above center of gravity of the instrument.

14. The device as defined in claim 9, wherein the mounting plate is a central mounting plate situated between the spaced outer yokes.

15. The device defined in claim 10, wherein the support means also includes outrigger means for extending laterally outwardly the cross-member and a side mounting plate coupled thereto.

16. A device for translating motion of an operator's wrist and arms into controlled movement of a motion picture camera or other aimed instrument, comprising:
 a) instrument holding means, comprising mounting means for mounting the camera in a selected position, and support means coupled to the mounting means and extending upwardly therefrom;
 b) a pair of spaced outer open rings coupled to the support means and having free ends extending outwardly therefrom;
 c) a pivotal inner closed ring pivotally mounted within each of the open rings at the free ends thereof so as to define a pivot axis; and
 d) a pair of hand grips, each of which is rigidly mounted diametrically across the inner ring at a selected grip angle to the pivot axis.

17. The device as defined in claim 16, wherein the support means comprises a pair of spaced uprights and a cross-piece extending therebetween.

18. The device as defined in claim 16, wherein the mounting means comprises a mounting plate slidably coupled to the cross-piece.

19. The device as defined in claim 16, wherein the outer rings are coupled to the uprights in an offset fashion.

20. The device as defined in claim 16, wherein the outer rings are slidably mounted to the uprights.

* * * * *